(12) United States Patent
Karushev et al.

(10) Patent No.: US 11,482,746 B2
(45) Date of Patent: Oct. 25, 2022

(54) CATHODE FOR METAL-AIR CURRENT SOURCES METAL-AIR CURRENT SOURCES CONTAINING THE SAME

(71) Applicant: POWERMERS INC., Westerville, OH (US)

(72) Inventors: Mikhail Pavlovich Karushev, St. Petersburg (RU); Irina Anatolievna Chepurnaya, St. Petersburg (RU); Evgenia Alexandrovna Smirnova, St. Petersburg (RU); Alexandr Mikhailovich Timonov, St. Petersburg (RU); Yulia Alexandrovna Polozhentseva, St. Petersburg (RU); Darya Olegovna Savenko, St. Petersburg (RU); Semyon Kogan, Newton, MA (US)

(73) Assignee: Powermers Inc., Columbus, OH (US)

(*) Notice: Subject to any disclaimer, the term of this patent is extended or adjusted under 35 U.S.C. 154(b) by 401 days.

(21) Appl. No.: 16/066,501

(22) PCT Filed: Dec. 20, 2016

(86) PCT No.: PCT/IB2016/001998
§ 371 (c)(1),
(2) Date: Jun. 27, 2018

(87) PCT Pub. No.: WO2017/115151
PCT Pub. Date: Jul. 6, 2017

(65) Prior Publication Data
US 2020/0287257 A1 Sep. 10, 2020

(30) Foreign Application Priority Data
Dec. 28, 2015 (RU) .................. 2015156759

(51) Int. Cl.
*H01M 4/02* (2006.01)
*H01M 12/06* (2006.01)
(Continued)

(52) U.S. Cl.
CPC .......... *H01M 12/06* (2013.01); *H01M 4/9041* (2013.01); *H01M 4/9083* (2013.01); *H01M 2004/8684* (2013.01)

(58) Field of Classification Search
CPC ....................................................... H01M 4/02
See application file for complete search history.

(56) References Cited

U.S. PATENT DOCUMENTS 6,795,293 B2   9/2004   Timonov et al.
7,382,603 B2   6/2008   Timonov et al.
(Continued)

FOREIGN PATENT DOCUMENTS

RU   2194721 C2   12/2002
RU     28790 U1    4/2003
(Continued)

OTHER PUBLICATIONS

English translation of PCT International Search Report for PCT International Patent Application No. PCT/IB2016/001998; dated Jun. 29, 2017; (3 pages).
(Continued)

*Primary Examiner* — Jacob B Marks
(74) *Attorney, Agent, or Firm* — Erickson Law Group, PC (57) ABSTRACT

The invention relates to electrochemical current sources, more particularly to metal-air current sources, and even more particularly to lithium-air current sources and their electrodes. A cathode comprises a base made of a porous electrically conducting material that is permeable to molecular oxygen, the working surface of which has a copolymer applied thereto, which is produced by the copolymerization (Continued)

of a monomeric transition metal coordination complex having a Schiff base and a thiophene group monomer. The monomeric transition metal coordination complex having a Schiff base can be, for example, a compound of the [M(R,R'-Salen)], [M(R,R'-Saltmen)] or [M(R,R'-Salphen)] type, and the thiophene group monomer can be a compound selected from a thiophene group consisting of 3-alkylthiophenes, 3,4-dialkylthiophenes, 3,4-ethylenedioxythiophene or combinations thereof. A current source comprises the described cathode and an anode made from an active metal, in particular lithium, wherein the cathode and the anode are separated by an electrolyte containing ions of the metal from which the anode is made. It has been established that in this system, the copolymer exhibits the properties of an effective catalyst. The technical result is an increase in the specific energy, specific power and number of charge and discharge cycles of a metal-air current source.

15 Claims, 3 Drawing Sheets

(51) Int. Cl.
*H01M 4/90* (2006.01)
*H01M 4/86* (2006.01)

(56) References Cited

U.S. PATENT DOCUMENTS

| | | | |
|---|---|---|---|
| 7,563,354 B2 * | 7/2009 | Timonov | H01M 4/606 |
| | | | 205/316 |
| 9,178,254 B2 | 11/2015 | Lee et al. | |
| 2004/0057191 A1 | 3/2004 | Timonov et al. | |
| 2005/0217998 A1 | 10/2005 | Timonov et al. | |
| 2007/0065719 A1 | 3/2007 | Timonov et al. | |
| 2012/0141889 A1 | 6/2012 | Lee et al. | |
| 2014/0127596 A1 | 5/2014 | Sun et al. | |
| 2014/0295291 A1 | 10/2014 | Kondo et al. | |
| 2017/0012293 A1 | 1/2017 | Karushev et al. | |

FOREIGN PATENT DOCUMENTS

| | | |
|---|---|---|
| RU | 2236067 C2 | 9/2004 |
| RU | 2431908 C2 | 10/2011 |
| RU | 2575194 C1 | 2/2016 |
| WO | 2013049460 A1 | 4/2003 |
| WO | 03/065536 A2 | 8/2003 |
| WO | 2011097286 A2 | 8/2011 |

OTHER PUBLICATIONS

PCT International Preliminary Report on Patentability (Chapter I of the Patent Cooperation Treaty) and translation for International Application No. PCT/IB2016/001998, dated Jul. 12, 2018, 13 pages.

* cited by examiner

CATHODE FOR METAL-AIR CURRENT SOURCES METAL-AIR CURRENT SOURCES CONTAINING THE SAME

CROSS REFERENCE TO RELATED APPLICATIONS

This application is a national phase under 35 U.S.C. § 371 of International Application No. PCT/IB2016/001998 filed on Dec. 20, 2016, which claims priority to and benefit of Russian Application No. 2015156759 filed on Dec. 28, 2015, and the entirety of these applications are incorporated by reference herein.

FIELD OF TECHNOLOGY

The invention relates to electro-technical current sources, particularly lithium-air current sources and electrodes for them, and may be used to create various energy storage devices, for example, batteries with high specific electrical characteristics.

PRIOR ART

Metal-air current sources usually include an anode made from an active metal, and a cathode that is air-permeable or more precisely permeable for molecular oxygen, separated by an electrolyte containing ions of the metal from which the anode is made. The cathode appears as a porous, electrically conductive structure with a highly developed surface, generally made of carbon material, on whose surface occur electrochemical reactions that reconstitute and discharge molecular oxygen and discharge it from the oxygen-containing metal compound, for example from the oxide or peroxide of the metal in the process of the discharging and charging of the current source.

In particular, when lithium is used as the metal of the anode in so-called lithium-air current sources, the electrochemical processes that occur are described in the following way.

When the lithium-air current source is discharged, oxidation of the lithium takes place on the anode, from which the lithium ions pass into the electrolyte, while an electrochemical reconstitution of the molecular oxygen that enters from the surrounding atmosphere through the porous cathode to the cathode-electrolyte boundary, takes place on the cathode. The electrochemical reactions that occur in such a system during discharge are described as follow:

on the anode: $Li-e=Li^+$,
on the cathode: $O_2+4Li^++4e=2Li^++O_2+2e=Li_2O_2$.

During the charging of such a current source, the oxygen contained in the oxide or peroxide of lithium, is oxidized on the cathode into molecular oxygen and returns back into the atmosphere. The lithium ions are reconstituted into metallic lithium on the anode. The electrochemical reactions that occur in such a system during charging are described as follow:

On the cathode: $2Li_2O-4e=4Li^++O_2$ or $Li_2O-2e=2 Li^++O_2$
On the anode: $Li^++e=Li$.

Lithium-air current sources have unique characteristics, in that the cathode-active material—oxygen—is not stored in the source, but comes in from the surrounding atmosphere. A lithium-air current source has an open-circuit voltage (EMF) in the order of 2.91 V, while its theoretical accounting specific energy is 11,140 W×h/kg [K. M. Abraham. "A Brief History of Non-aqueous Metal-Air Batteries"//ECS Transactions, 3 (42) 67-71 (2008)]. Such current sources may be used, for example, as batteries for automobiles, which require rechargeable current sources that have a lifetime of at least 1000 charge-discharge cycles and a specific power value of at least 400 W/kg.

Various metal-air current sources are known. Thus, in U.S. Pat. No. 5,510,209, there is described a metal-air current source comprising a metallic anode, a composite carbon cathode and an electrolyte with high ion conductivity, located as a polymer film between the anode and the cathode, on which there occur the processes of reconstituting molecular oxygen during discharge. As a metal for the anode, metals such as lithium, magnesium, sodium, calcium, aluminum and zinc are proposed for use. This current source has a sufficiently high specific energy value —in the order of 3,500 W×h/kg (relative to the mass of the cathode); however, it has a low discharge current density, ranging from 0.1 $mA/cm^2$ to 0.25 $mA/cm^2$; in other words, it has a very low specific power.

The particularities that are indicated are due to the low velocity of the electrochemical reactions that take place on the cathode, because of the high activation energy of these processes. Accordingly, a significant number of the known inventions from prior art are connected with various improvements of the cathode, which, in the required manner, would affect the electrochemical properties of such current sources.

In particular, in order to increase the velocity of the reactions indicated and to thereby increase the specific power of metal-air current sources on the surface of the cathode, where the reconstitution of molecular oxygen directly takes place and it is separated from the oxygen-containing metal compound, for example, from the oxide or peroxide of a metal, in the discharge-charge process of the current source, in one way or another, a catalyst is applied.

Thus, there is known a cathode for a lithium-air current source, described in application KR 20140056544 comprised of manganese dioxide with the addition of nanoparticles of noble metals (platinum, palladium, ruthenium, iridium and gold), applied to a nickel grid. However, the use of precious metals in the cathode material results in the making the electrode significantly costlier and also the current source in which it is used.

U.S. Pat. No. 7,087,341, there describes a metal-air current source, comprising an anode and a cathode, in which the cathode includes a gas diffusion layer, a current collector and a layer with a catalyst comprising carbon particles, the average size of which does not exceed 10 microns and particles of a catalyst. As catalysts, manganese oxide, cobalt oxide and nickel oxide are suggested. When a laboratory electrochemical cell was tested, which modeled such a current source, particularly with a mixture of nickel Ni(II) oxide and cobalt Co (II) oxide as a catalyst enabling the reconstitution of the oxygen of the catalyst, the following values were obtained: specific power —35 W/kg, specific energy —80 W×h/kg. The number of charge-discharge cycles did not exceed 30. Clearly, such a catalyst does not provide the desired high operating performance for a current source.

There is known a lithium-air current source, described in patent CN 102240574, comprised of a lithium anode, a carbon cathode containing the catalysts for the oxygen reaction, a separator and an organic electrolyte. As a catalyst on the cathode, there are used complexes of cobalt and manganese with pyridine, 4,4'-bipyridine, pyrazine and pyrrole. Monomer complexes that are used as catalysts are mixed with a carbon material in the process of manufacturing the cathode and are adsorbed on it. However, in the process of preserving and operating the current source, the molecules of the catalyst that are weekly bonded with the carbon material can dissolve in the electrolyte; as a result, the efficiency of the catalyst will noticeably decrease from one charge-discharge cycle to the next.

Also known is the use of conductive polymers in metal-air current sources. Thus, in application WO 2011/097286, there is described a metal-air current source whose cathode includes a gas diffusion layer, comprised of finely dispersed carbon, coated with the help of an electrochemical or chemical method for applying the layer of conductive polymer, for example, polythiophene and/or polypyrrole. It has been shown that a conductive polymer somewhat improves the efficiency of the electrochemical reconstitution of oxygen, as compared with finely dispersed carbon; however, it is insufficient for practical use.

Therefore, in addition, as a catalyst, it is proposed to use particles of metals, for example, silver and/or oxides of metals. The role of the conductive polymer is essentially to physically hold back particles of the catalyst. This approach of physically bonding particles of the catalyst with the help of conductive polymers is also used in other chemical current sources, for example, in fuel cells, as shown in application CN 1674330A.

As can be seen from prior art, at the present time, metal-air current sources, particularly the best of them, lithium-air current sources, have a lifetime in the order of several dozen charge-discharge cycles; at the optimum specific power, no more than several dozen W/kg. Here it should be admitted that the electrical parameters of such current sources are significantly dependent on the electrochemical properties of the cathode, particularly the efficiency of the catalyst for the oxygen reaction. The problem that this invention aims to solve is to create a cathode for a metal-air current source possessing high electrochemical activity with respect to oxygen reactions, i.e. reactions for the reconstitution of molecular oxygen and reactions to separate oxygen, which, in turn, will make it possible to create a metal-air current source with improved characteristics in terms of specific energy, specific power and the number of charge-discharge cycles.

DISCLOSURE OF THE INVENTION

Application is being made for a group of inventions: a cathode and a metal-air current source, in which the above-mentioned cathode is used, forming a single inventive concept, i.e. to achieve the possible of creating metal-air current sources with improved characteristics in terms of specific energy, specific power and the number of charge-discharge cycles.

One object of the invention is a cathode for metal-air current sources, including a base made of porous electrically conductive material that is permeable to molecular oxygen, on the working surface of which there is applied a copolymer obtained by means of the copolymerization of the monomer complex compound of a transition metal with A Schiff base and a monomer from the thiophene group.

Said copolymer consists of fragments of the above-mentioned complex compound of a transition metal with A Schiff base and fragments of a monomer from the group of thiophenes that are present in the composition of the copolymer in molar ratios, connected with the composition of the mixture of the initial monomers (before polymerization). Each of the constituent parts of the copolymer fulfils its function in the electrochemical processes that occur on the cathode.

Fragments of the complex compound of transition metal with A Schiff base —as has been discovered by the authors of the invention —turn out to be highly effective reaction centers, i.e. a catalyst that is capable of concentrating the molecular oxygen that comes in through the porous base of the cathode, and the metal ions coming from the electrolyte. This results in a decrease in energy losses in the reaction to reconstitute the oxygen and in an increase of its velocity, which provides an increase in the specific energy and specific power of the current source as an energy storage system.

One of the reasons that limit the useful lifetime (number of charge-discharge cycles) of metal-air current sources is the blockage of the surface of the catalyst that is applied on the cathode by large non-conductive and insoluble crystals of the oxide or peroxide of the active metal. To the extent that fragments of the complex compound of the transition metal with a Schiff base that appear in such a system as a catalyst consist of individual reaction cents, the products of the electrical reconstitution of the oxygen (oxide or peroxide of the active metal) that are formed on them have a nanocrystal structure. Such a structure of the products of the electrical reconstitution oxygen provides for their more complete oxidation when the current source is charged. This makes it possible to obtain a greater number of charge-discharge cycles in the system.

The fragments of the monomer from the thiophene group that enter into the composition of the copolymer promote an increase in the charge transport velocity (or the electrical conductivity of the copolymer), which increases the velocity of the cathode reactions and raises the specific power of the current source in which this cathode is used. Besides, the high electrical conductivity of the copolymer makes it possible to increase its thickness while preserving catalytic activity on the entire layer of the copolymer, which together also provides a high specific energy for the current source.

From prior art there is known the use of conductive polythiophenes for the manufacture of a current source cathode. Particularly, polythiophenes are used as a material for carbonization in order to obtain the carbon base for a cathode of a lithium-air battery (CN 104518225); as a material that connects the current lead and the catalyst of a fuel cell cathode (GB 201009720); as a barrier layer for a cathode, protecting the components of a lithium-air battery from moisture (US 20150079485); as a protective layer, protecting the active component of the cathode of a lithium-air battery from the loss of oxygen from a crystal lattice (WO 2015149211). However, from prior art there is known the use of polymer materials on a base of complexes of transition metals with a Schiff base, both in the form of individual polymers and in in a composition of copolymers, including copolymers with thiophenes, as catalysts for the oxygen reaction in metal-air current sources.

As a material for the base of the cathode, it is preferable to use a porous carbon material with a developed surface. Carbon materials have a low density (specific weight), sufficient mechanical strength, a high degree of surface development, which can be easily varied by known methods and, at the same time, they are chemically inert; they possess good adhesion to the copolymer, which is proposed for use in accordance with the present invention.

To obtain a copolymer as monomer complex compound of a transition metal with a Schiff base, a compound of the form [M(R, R'Salen)] may be used that has the structure wherein M is the transition metal, selected from the group nickel, palladium, platinum, cobalt, copper, manganese;

Salen is the residue of bis(salicylaldehyde)ethylenediamine in the Schiff base;

R is the substituent in the Schiff base, selected from the group H, CHO—, $C_2H_5O$—, HO or —$CH_3$;

R' is the substituent in the Schiff base, selected from the group H or any of the halogens.

Also, to obtain the copolymer, as a monomer complex compound of a transition metal with a Schiff base, a compound of the form [M(R, R'Saltmen)] may be used that has the structure wherein M is the transition metal, selected from the group nickel, palladium, platinum, cobalt, copper, manganese;

Saltmen is the residue of bis(salicylaldehyde)tetramethylethylenediamine in the Schiff base;

R is the substituent in the Schiff base, selected from the group H, CHO—, $C_2H_5O$—, HO or —$CH_3$;

R' is the substituent in the Schiff base, selected from the group H or any of the halogens.

Also, to obtain the copolymer as a monomer complex compound of a transition metal with a Schiff base, a compound of the form [M(R, R'Salphen)] may be used that has the structure wherein M is the transition metal, selected from the group nickel, palladium, platinum, cobalt, copper, manganese;

Salphen is the residue of bis(salicylaldehyde)-o-phenylenediamine in the Schiff base;

R is the substituent in the Schiff base, selected from the group H, CHO—, $C_2H_5O$—, HO or —$CH_3$;

R' is the substituent in the Schiff base, selected from the group H or any of the halogens.

As a second component to obtain the copolymer, a monomer selected from the group: thiophene, 3-alkylthiophen, 3,4-dialkylthiophene, 3,4-ethylenedioxythiophene (EAOT or EDOT) or a combination thereof.

A monomer complex compound of a transition metal with a Schiff base and a monomer from the thiophene group, used to obtain the above-mentioned copolymer, can be taken in a molar ratio ranging from 1:05 to approximately 1:10, preferably 1:2, for example.

Another object of the invention is metal-air current source comprising a cathode, as it is characterized above, including in the particular cases indicated when it is designed, and an anode made from a material that includes at least one chemically active metal, where the anode and the cathode are divided by an electrolyte that contains ions of the chemically active metal mentioned above that enters into the composition of the anode.

As a material from which the anode of the metal-air current source is made, use can be made of an alkali metal, an alkaline earth metal or a transition metal. Such metals have a negative electrode potential; therefore, they are preferably used as the material of the anode.

In particular, as an alkali metal, lithium can be used, which has the most negative electrode potential. In this case, as an electrolyte in such a current source with a lithium anode, use may be made, for example, of a solution of lithium trifluoromethanesulfonate in a dimethyl ether of tetraethylene glycol with the molar ratio of these components ranging from 1:2 to approximately 1:8, preferably 1:4. The indicated range is determined by the solubility of the salt of lithium trifluoromethanesulfonate in the solvent dimethyl ether of tetraethylene glycol. The selection of the electrolyte is determined by the fact that it provides high ion conductivity; it is stable in a wide range of voltages (area of electrochemical stability); moreover, lithium does not react with it, which rules out a self-discharge of the lithium-air current source with such an electrolyte.

Also as a material, from which the anode is made, an alloy may be use, including one or more chemically active metals. In particular, use may be made of a lithium-silicon alloy, a lithium-aluminum alloy, a lithium-tin alloy or a lead-sodium alloy. The above-mentioned alloys have sufficient negative electrode potential and, at the same time, they provide for a higher thermodynamic (corrosion) stability and mechanical stability of the anode.

BRIEF DESCRIPTION OF THE INVENTION

On FIG. 1 and FIG. 2, as an example of an embodiment of the present invention, there is diagrammatically shown the construction of a lithium-air current source, comprising a lithium anode and a cathode in the form of a carbon base with a copolymer applied on it in accordance with the present invention, illustrating the discharge process of such a current source. At the same time, FIG. 1 shows the state of the current source at the beginning of the discharge process, while

FIG. 3 provides a diagrammatic representation of a fragment [Co(Schiff)] entering into the composition of the copolymer, while FIG. 3 represents its graphic formula, while FIG. 3(b) provides a diagrammatic representation of the fragment [Co(Schiff)] corresponding to its spatial arrangement.

FIG. 6 illustrates the interaction of the lithium ions with the fragments [Co(Schiff)] of the copolymer, while FIG. 6(a) represents the graphic formula of a fragment [Co(Schiff)] of the copolymer interacting with the lithium ions, while FIG. 6(b) illustrates such an interaction with the corresponding spatial arrangement of the lithium ions and the indicated fragment of the copolymer interacting among themselves.

EMBODIMENT OF THE INVENTION

A possibility for an embodiment of the present invention is shown below in the example of a lithium-air current source (cf. FIG. 1 and FIG. 2), comprising lithium anode 1 and cathode, comprising base 3 made of a porous electrically conductive material that is permeable to molecular oxygen with a coating made of copolymer 4 applied to it, obtained by the copolymerization of a monomer complex compound of cobalt with a Schiff form base [Co(Schiff)] and a monomer from the thiophene group, in this case 2,3-ethylendioxythiophene (EDOT). Mechanically, anode 1 and cathode 2 are divided by separator 5, but electrochemically by electrolyte 6 containing lithium ions 7. Copolymer 4 may be applied on the surface of base 3 of cathode 2 by electrochemical polymerization from a solution of a mixture of monomer [Co(Schiff)] and monomer EDOT. As a material for base 3, use may be made of a material containing carbon of the brand Carbon Super® produced by the company TIMCAL. As shown on FIG. 1 and FIG. 2, in the structure of copolymer 4, fragments of complex [Co(Schiff)], including metallic center 8 and ligand environment (ligand) 9 and EDOT 10 fragments can be separated.

Figure 3:
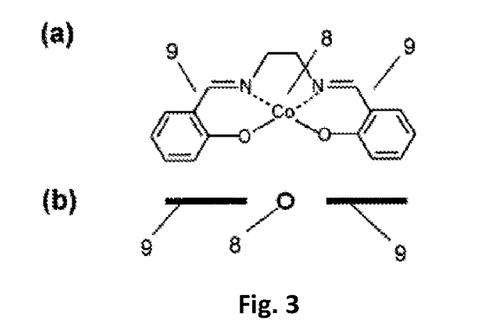
Figure 4:
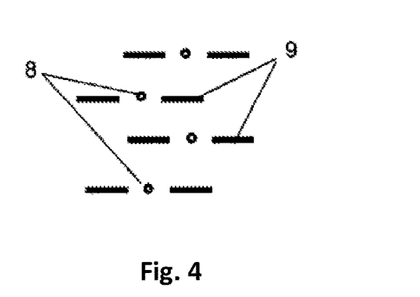
FIG. 4 provides a diagrammatic representation of the spatial stack structure that is formed in the copolymer from the fragments [M(Schiff)], particularly [Co(Schiff)].

Studies that have been conducted, including by one of the authors of the present invention, have shown that the polymer complexes of the compound of a transition metal with a Schiff base have a specific stack structure with fragments of the polymer connected with one another by means of donor-acceptor interaction between the metallic center of one fragment of the polymer and the ligand of another fragment of the polymer [I. E. Popeko, V. V. Vasiliev, A. M. Timonov, G. A. Shagisultanova. "Electrochemical Behavior of Palladium (III) with Schiff's Bases, Synthesis of Mixed-Valent Pd(II)-Pd(IV) Complexes"//Russian J. Inorg. Chem. 1990, V. 35, N. 4, p. 933]. FIG. 3 provides a diagrammatic representation of a fragment [Co(Schiff)] entering into the composition of copolymer 4, including metallic center 8 and ligand environment (ligand) 9. In this example, metallic center 8 is cobalt (Co), while ligand 9 is Salen. FIG. 4 gives a diagrammatic representation of the spatial stack structure that is formed in copolymer 4 from the fragments [Co (Salen)] and in which these fragments are arranged in parallel, following one another, so that, in order for metallic center 8 to be arranged immediately above and below ligands 9 of the adjacent fragments, which are essential for previously mentioned alignment of the stack structure, thanks to the donor-acceptor interaction.

The possibility for achieving the indicated result, with respect to the energy parameters of the current source under consideration is connected to the properties of the above-mentioned copolymer discovered by the authors of the present invention.

Figure 5:
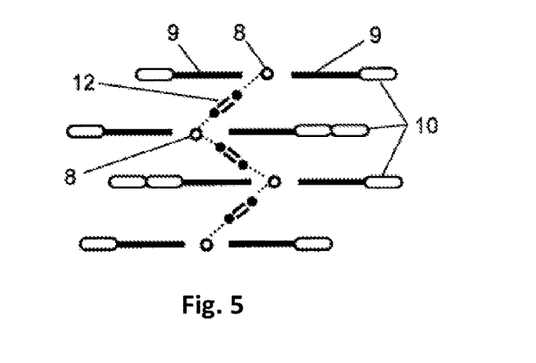
FIG. 5 diagrammatically shows the interaction of molecular oxygen with the fragments [Co(Schiff)] of the copolymers according to the present invention.

Fragments of [Co(Schiff)] form have a strong chemical affinity to molecular oxygen; in an air environment, such structures are capable of interacting with molecular oxygen by forming bridges of a "metal-oxygen-metal" type between metallic centers [El-Ichiro Ochiai. "Electronic structure and oxygenation of bis(salicylaldehyde)ethylenediminicobalt (II)"//J. Inorg. Nucl. Chem. 1973, V. 35, p. 1727]. FIG. 5 shows such an interaction of molecular oxygen with metallic centers 8 of fragments [Co(Schiff)] of copolymer 4. In particular, for the polymer poly-[Co(Schiff)], it has been shown that the concentration of oxygen in it is approximately 500 times higher than in air, while such oxygen 12 connected with the polymer has a bond that is longer—and thereby weakened—between the oxygen atoms than a molecule of free molecular oxygen. This means that the bonded oxygen has transitioned to more active state because of the action of the fragment [Co(Schiff)] that has presented itself as a catalyst in such a system.

Also fragments of a monomer from the thiophene group entering into the composition of the copolymer promote an increase in the electrical conductivity of the copolymer, which increases the velocity of the cathode reactions and raises the specific power of the current source in which this cathode is used. Besides this, the high electrical conductivity of the copolymer makes it possible to increase its thickness while preserving the catalytic activity in the whole layer of the copolymer, which, taken together, also provides for the high specific energy of the current source.

In studying cathodes of a lithium-air current source in relation to the present invention, it has been established that the use—in the composition of a cathode—of a coating made of a copolymer obtained by copolymerization of a monomer complex compound [M(Schiff)] and a monomer from the thiophene group, other things being equal, leads to an increase in the discharge current of the cathode as compared to an analogous electrode, in which a coating made of a polymer poly-[M(Schiff)] is used.

To determine the correlation of the monomer complex compound [M(Schiff)] and the monomer from the thiophene group in the mixture that is used to obtain the copolymer, wherein the indicated result of the invention is achieved, including an optimal value for the indicated correlation, the following experiment was done, including the manufacture and testing of electrodes with a differing polymer coating with respect to its composition.

To a glass-graphite electrode (surface area 0.07 cm$^2$) there was applied a coating of acetonitrile solvents containing a monomer complex compound [M(Schiff)], in particular a complex [Co(CH$_3$O-Salen)] and a compound from the thiophene group—EDOT.

Here, the value of the concentration of the compound [Co(CH$_3$O-Salen)] was set as constant and equal to 1 mmol/L, while the value of the concentration of EDOT for different examples of electrodes was varied from zero to 10 mmol/L. In addition, the solution included the background electrolyte $LiBF_4$ in a concentration of 0.1 mol/L. The application of the copolymer coating was carried using the method of electrochemical polymerization with cyclical variation of the potential of the electrode within a range from 0 V to +1.5 V (in relation to a silver-silver chloride electrode) with a velocity of 50 mV/sec (2 cycles were carried out). After this, the electrode was washed in acetonitrile and was dried for 2 minutes at room temperature.

An electrode obtained in this manner was placed into a three-electrode airtight electrochemical cell, filled with 0.1 mol/L of $LiBF_4$ in acetonitrile. As an auxiliary electrode a glass-graphite plate measuring 1.5×1.0 cm was used; the comparison electrode was an $Ag^+/Ag$ electrode filled with $5×10^{-3}$ mol/L of a solution of $AgNO_3$ in acetonitrile (a standard electrode of the brand MF-2062 produced by the company Bioanalytical Systems, BASi). The electrode studied was subjected to a charge in voltammeter mode while shifting the potential from 0 V to +1.3 V with respect to the silver chloride electrode with a velocity of 50 mV/sec. After that, the electrode was subjected to a discharge in voltammeter mode while shifting the potential from +1.3 V to −0.7 V with respect to the silver chloride electrode at a velocity of 50 mV/sec, fixing the discharge current at a potential value of 0.3 V.

Figure 7:
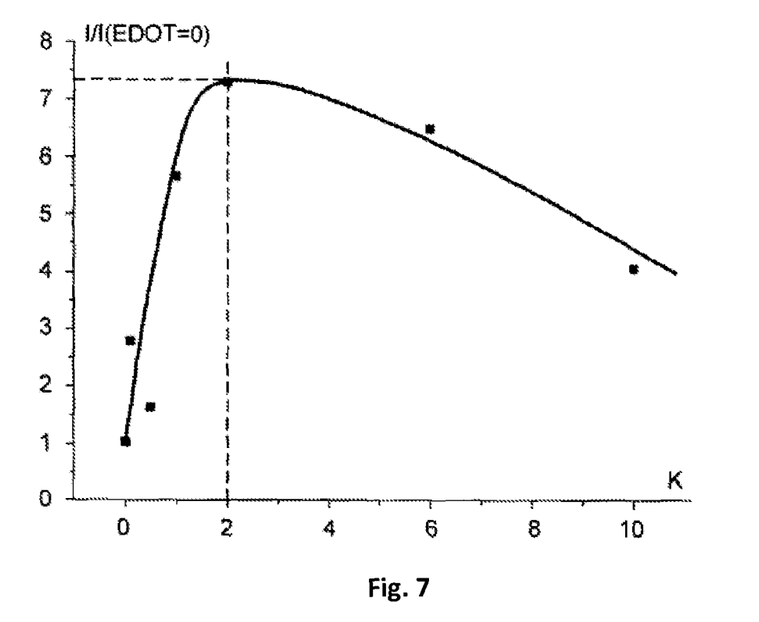
FIG. 7 represents the results of the experiment to determine the correlation of the concentrations of the monomer complex compound of the transition metal with a Schiff base and a monomer from the group of thiophenes used to obtain the copolymer according to the present invention.

The results of the experiments are shown in FIG. 7, where, on the x axis, there are shown the values of the K correlations of the molar concentrations of EDOT and the [Co($CH_3$O-Salen)] compound, while, on the y axis, there are the values of the discharge current I that were indicated, normalized to the discharge current of the electrode with the coating that had been obtained at zero concentration of EDOT–I(EDOT=0). The experimental values and the approximating curve are shown. It can be seen that even a small addition of EDOT to [Co($CH_3$O-Salen)] in the mixture that is used to obtain the copolymer leads to an increase in the discharge current of the electrode. Apparently, this is related to the increase in the electron conductivity of the copolymer and an improvement in charge transport conditions in it. Furthermore, the addition of EDOT fragments that are good conductors of a charge makes a larger number of the fragments [Co(Schiff)] available for the electrochemical reaction on the electrode. In other words, for all practical purposes, it increases the number of active metallic centers in the copolymer. From this standpoint, the greatest efficiency is shown by the copolymer that is obtained from the solution with a concentration ratio of [Co($CH_3$O-Salen)] and EDOT of 1:2 (the maximum on the curve shown in FIG. 7 corresponds to this).

It can be seen that, in range from approximately 1:0.5 to approximately 1:10 for the values of the relationship of the concentrations of [Co($CH_3$O-Salen)] and EDOT, there is observed a high operational efficiency of the electrode. When the EDOT content is further increased, there is observed a noticeable decrease in the discharge currents in the electrode under consideration, which can probably be related to the physical blockage of the catalytic cobalt centers by fragments of thiophene.

We will consider the charge and discharge processes of a current source in relation to the present invention.

Process of Discharging

Figure 1:
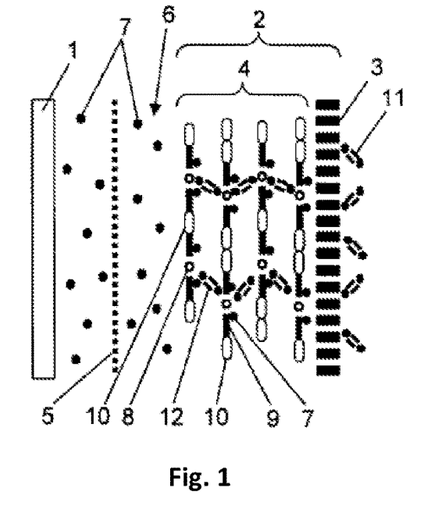
Figure 2:
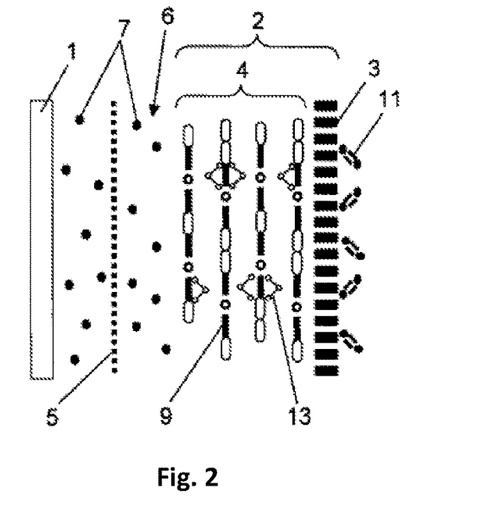
FIG. 2 shows this at the end of the discharge process.
Figure 6:
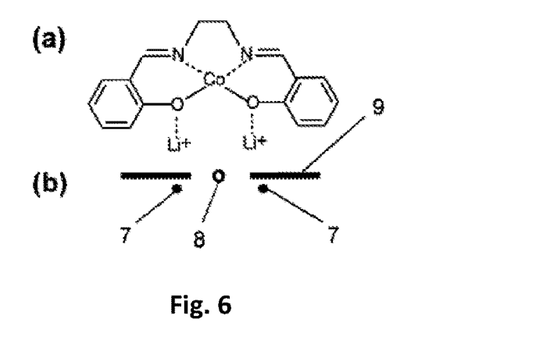

In the process of discharge of a lithium-air current source (cf. FIG. 1), atmospheric oxygen 11 penetrates through base 3 of cathode 2 and connects with fragments of the [Co(Schiff)] complex of copolymer 4, passing over into a more active state (position 12 on FIG. 1). Lithium anode 1 is oxidized with the formation of lithium ions 7, which begin to move in the direction of cathode 2. Furthermore, lithium ions 7 are attracted to fragments of the [Co(Schiff)] complex of copolymer 4 of cathode 2 by the oxygen atoms of ligand 9, as illustrated in FIG. 6. Here, FIG. 6(a) presents the graphic formula of the fragment of the [Co(Schiff)] complex of copolymer 4, interacting with the lithium ions, while FIG. 6(b) provides an illustration of such an interaction, in which lithium ions 7 are attracted to the negatively charged oxygen atoms of ligand 9 of the [Co(Schiff)] fragment of copolymer 4. The excess of electrons in copolymer 4 leads to the reconstitution of bound oxygen 12. The products of the reconstitution are stabilized by lithium ions 7 in the form of a nanocrystal oxide or peroxide of lithium 13 (cf. FIG. 2).

The described reaction that reconstitutes the oxygen proceeds very rapidly, inasmuch as the reconstituted oxygen and the lithium ions are concentrated in one and the same reaction zone of the [Co(Schiff)] fragment of the copolymer at a close distance from one another, which facilitates the chemical interaction between the lithium and the oxygen, leading to the formation of an oxide or peroxide of lithium. The catalysts used for the reconstitution, as a rule, adsorb and concentrate only one reagent, usually the oxygen. The [Co(Schiff)] fragments of the copolymer that exhibit catalytic properties "attract" both the lithium ions and the oxygen. The process of discharge ends after whole surface of the cathode is coated with a thin coat of the products of the discharge.

Process of Charge

In the process of charging a current source, designed in accordance with the present invention, as a result of applying a positive electrical charge to cathode 2 with respect to anode 1, metallic centers 8 of the [Co(Schiff)] fragments of polymer 4 are oxidized and pass over into an oxidized state with a degree of oxidation of +3.

The metallic centers—in this case, cobalt atoms—in such an oxidized condition are powerful oxidizing agents capable of oxidizing an oxide or peroxide of lithium back into molecular oxygen and lithium ions. The molecular oxygen leaves the reaction zone and escapes into the surrounding atmosphere through the porous carbon material of base 3 of cathode 2, while lithium ions 7 diffuse back toward lithium anode 1, where they are reconstituted into metallic lithium. Copolymer 4, in this case, acts as an electrochemical catalyst, remaining in an oxidized state, thanks to the positive potential that has been applied to cathode 2 from an outside power source.

In the process of discharge that has been described, the coating of the cathode remains stable in the whole range of the operational potentials; no irreversible changes in the structure of the copolymer take place. As a result of the charging of the lithium-air current source under consideration, the oxide (peroxide) of lithium actually turns back into oxygen and lithium ions, while the surface of the cathode is freed from these products that were formed in the process of the discharge of the current source. All of this together makes it possible to substantially increase the number of charge-discharge of the current source as compared to those known.

Example 1. Charge-Discharge Process of an Electrode with a Copolymer Coating

Production of an electrode. As a base for the electrode, there was selected a glass-graphite disk with a diameter of 22 mm (surface area 0.07 $cm^2$) produced by the company BASi (MF 2012). To the working surface of the electrode, using the method of electrochemical polymerization, there was applied copolymer from an acetonitrile solution containing $1\times10^{-3}$ mol/L of a monomer of complex compound of cobalt with Schiff base [Co(CH$_3$O-Salen)], $2\times10^{-3}$ mol/L of EDOT and 0.1 mol/L of background electrolyte tetraflouroborate tetraethylammonium $(C_2H_5)_4NBF_4$. The polymerization was carried out in an airtight case filled with argon with a total concentration of water and oxygen of less than 10%. The process comprised two cycles of changing the potential of the electrode in a range from 0 V to +1.5 V with respect to the silver-silver chloride electrode with a velocity of 400 mV/sec. After the end of the process of polymerization, the electrode was washed with acetone nitrile and subjected to drying for 2 minutes at room temperature.

Testing of the electrode. The electrode was placed in a three-electrode airtight electrochemical cell, filled with 0.1 mol/L of a solution of LiBF$_4$ in acetone nitrile saturated with oxygen by preliminary blowing of said solution for 15 min.

As an auxiliary electrode, a glass-graphite rectangle plate measuring 1.5×10 cm was used; the comparison electrode was an Ag+/Ag electrode, filled with $5\times10^{-3}$ mol/L of a AgNO$_3$ solution in acetone nitrile (a standard electrode of the brand MF-2062 produced by the company BASi).

Figure 8:
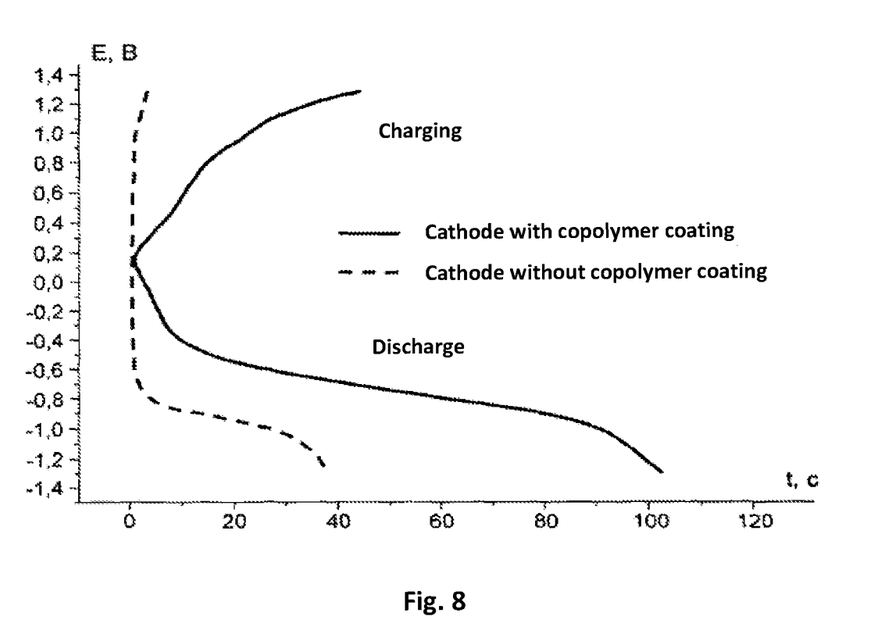
FIG. 8 represents the curves of the charging and the discharge of an electrode with a copolymer coating according to the invention and a control electrode.

The electrode was subjected to discharge and subsequent charging at a constant current of 13 µA. Analogous testing was conducted on similar such electrode without the layer of copolymer applied to its surface, i.e. a control electrode. The charge-discharge curves of the described electrodes are shown in FIG. 8, where the x axis shows the charge/discharge time, while the y axis shows the potential value on the electrode. It can be seen that the discharge capacity (which is reflected by the discharge time) of the electrode coated with the polymer significantly exceeds the potential value for the control electrode. Here, the potential of the electrode with the copolymer at the time of discharge is significantly higher, but at the time of charging it is significantly lower than corresponding potential values for the control electrode. This reflects the fact that the copolymer exhibits catalytic activity with respect to the processes of the charging and the discharge of the electrode. In turn, this provides for improved characteristics of the specific energy and specific power of the current source, in which this electrode will be used.

For convenience, in the experiment, as the base of the electrode, there was used glass-graphite, which is not a porous material that is permeable for oxygen. However, inasmuch as the processes of charging and discharge occurring in the polymer were studied, while the supply of oxygen into the reaction zone was carried out by means of prior saturation of the electrolyte with oxygen, the results of the studies adequately reflect the process occurring on the cathode in accordance with the present invention.

Example 2. Charging and Discharge of a Lithium-Air Current Source

Production of the electrodes and current source. In the production of the cathode, carbon material (of the brand Super P produced by the company TIMCAL) 80% by mass and a binding agent—polyvinylidene fluoride (of the brand HSV 900 produced by the company Arkema)—20% by mass were mixed in a solvent N-methyl-2-pyrrolidone (produced by the company Sigma-Aldrich). The mass obtained was uniformly applied on to Toray-30 gas-permeable carbon paper (Toray Carbon Paper TGP-H-030) and the preparation was subjected to drying for 12 hours at a temperature 120° C. to remove the residues of the solvent. The density of the application of carbon on the obtained base of the electrode was (0.9±0.1) mg/cm$^2$. Then, onto the base of the cathode that was obtained in this way, there was applied a coating made of a copolymer.

The process of application was carried in an airtight case filed with argon and with a total concentration of water and oxygen of less than $10^{-5}$%. The process of polymerization was carried out in an acetone nitrile solution containing 1.0 mmol/L of the monomer [Co(CH$_3$O-Salen)] and 2.0 mmol/L of the monomer EDOT, and also a background electrolyte −0.1 mmol/L of $C_2H_5)_4NBF_4$, at a potential of +1.5 V with respect to the silver-silver chloride electrode for 2 sec.

The anode was made of lithium foil with a thickness of 500 microns. The current source was collected in a steel case, type R2032 (coin-type). In the lid of the case, in contact with the cathode, which was a current contact jaw, there 21 openings with a diameter of 1 mm to provide for the access of oxygen to the cathode. The cathode and the anode were divided by a porous separator Celgard 2500 (produced by the company Celgard, LLC) with a thickness of 25 mm. As a lithium-containing electrolyte, 1 mol/L of a solution of lithium trifluoromethanesulfate LiFCF$_3$SO$_3$ (produced by the company Aldrich) was used in tetraethylene glycol dimethyl ether (TEGDME) produced by the company Acros.

Also, a control current source was prepared, differing from the one described—the experimental one—filled according to the present invention, only in that its cathode did not have the indicated copolymer coating.

Both current sources (experimental and control) were tested under identical charge-discharge conditions on a CT-3008W unit produced by the company NEWARE (KHP). The charge was produced at a constant current of 50 µA and the discharge at a constant current of 500 µA. In the process of testing, both current sources were in an oxygen atmosphere (at a pressure of 1 atm) at room temperature.

Figure 9:
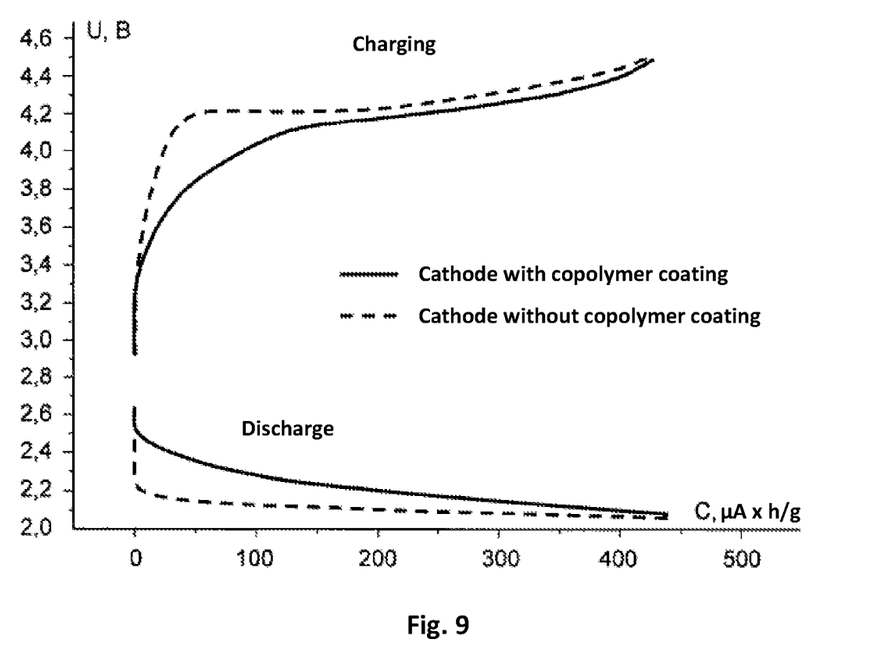
FIG. 9 represents the curves of the charging and the discharge of a lithium-air current sources with a cathode according to the invention and a control example of a current source.

FIG. 9 shows the experimental charging and discharge curves that were obtained for the control and the experimental current source. On the x axis, there is shown the specific capacity value (calculated on 1 g carbon), while on the y axis—the voltage value U of the current source. It can be seen that, in a lithium-air current source, the use of a cathode with copolymer coating according to the present invention provides a greater discharge voltage, and consequently, greater energy release upon discharge, but also less voltage, essential for the charging.

Despite the fact that, in the examples, examples are cited that were obtained while using, in the current source, complexes of cobalt with a Schiff base and EDOT, analogous results are shown with the use of other copolymers obtained from a mixture of metal complexes with a Schiff base, for examples, complexes of nickel, manganese and other transition metals, and monomers of the group of thiophenes.

Thus, the results of the experiments confirm that the use, in metal-air current sources, of a cathode, whose working surface has a coating made of a copolymer obtained by copolymerization of a monomer complex of a compound of a transition metal with a Schiff base and a monomer from the thiophene group leads to high energy characteristics for such current sources as compared to analogous current sources that do not contain the indicated polymer in the composition of the cathode. This is achieved thanks to the fact that the polymers indicated, as was discovered by the inventors, in such a system, act as catalysts of cathode reactions. Here, the high electrical conductivity of the copolymer makes it possible to increase its thickness while preserving the cata- lytic activity in the entire layer of the copolymer, which, taken together, provides for both the high specific power and the high specific energy of the current source. The reversibility of the reactions of oxidation and reconstitution on the cathode provides for a long useful life of the current source.

The invention claimed is:

1. Cathode for metal-air current sources, comprising a base made of a porous electrically conductive material that is permeable for molecular oxygen, on whose working surface there is applied a copolymer, obtained by polymerization of a monomer complex of a complex compound of a transition metal with a Schiff base 5 and a monomer from the thiophene group.

2. Cathode according to claim 1, in which, as the material for the base, a porous carbon material with a developed surface is used.

3. Cathode according to claim 1, in which, in order to obtain the copolymer, as a monomer of a complex compound of a transition metal with a Schiff base, a compound of the form [M(R, R'Salen)] 10 is used, having the structure wherein M is the transition metal, selected from the group nickel, palladium, platinum, cobalt, copper, manganese; Salen is the residue of bis(salicylaldehyde)ethylenediamine in the Schiff base; 15 R is the substituent in the Schiff base, selected from the group H, CHO—, C2H5O—, HO—or —CH3; R' is the substituent in the Schiff base, selected from the group H or any of the halogens.

4. Cathode according to claim 1, in which, in order to obtain the copolymer, as a monomer complex compound of a transition metal with a Schiff base, a compound of the form [M(R, R'Saltmen)] may be used that has the structure wherein M is the transition metal, selected from the group nickel, palladium, platinum, cobalt, copper, manganese; Saltmen is the residue of bis(salicylaldehyde)tetramethylethylenediamine in the Schiff base; R is the substituent in the Schiff base, selected from the group H, CHO—, C2H5O—, HO— or —CH3; R' is the substituent in the Schiff base, selected 5 from the group H or any of the halogens.

5. Cathode according to claim 1, in which, in order to obtain the copolymer, as a monomer complex compound of a transition metal with a Schiff base, a compound of the form [M(R, R'Salphen)] isused that has the structure wherein M is the transition metal, selected from the group nickel, palladium, platinum, cobalt, copper, manganese; Salphen is the residue of bis(salicylaldehyde)-o-phenylenediamine in the Schiff base; R is the substituent in the Schiff base, selected from the group H, CHO—, C2H5O—, HO or —CH3; R' is the substituent in the Schiff base, selected from the group H or any of the halogens.

6. Cathode according to claim 1, in which, in order to obtain the copolymer, as a monomer from the thiophene group, a compound, selected from the group thiophene, 3-alkylthiophen, 3,4- dialkylthiophene, 3,4-ethylenedioxythiophene or a combination thereof.

7. Claim according to claim 1, in which the monomer complex compound of a transition metal with a Schiff base and a monomer from the thiophene group used to obtain the indicated 20 copolymer are taken in a molar ratio from approximately 1.05 to approximately 1:10.

8. Cathode according to claim 7, in which the monomer complex compound of a transition metal with a Schiff base and the monomer from the thiophene group are taken in a molar ratio of approximately 1:2.

9. Metal-air current source comprising a cathode, designed according to any one of claim 1, and an anode, produced from a material, comprising 5 at least one chemically active metal, while theanode and the cathode are separated by an electrolyte containing ions of the indicated chemically activemetal that enters into the composition of the anode.

10. Current source according to claim 9, in which, as a material from which the anode is made, an alkali metal, an alkali earth metal or a transition metal is used.

11. Current source according to claim 10, in which, as the alkali metal indicated, lithium is used.

12. Current source according to claim 11, in which, as an electrolyte, a solution of lithium trifluoromethanesulfonate in a dimethyl ether of tetraethylene glycol is used, with the molar ratio of these components ranging from approximately 1:2 to approximately 1:8.

13. Current source according to claim 12, in which the ratio of the indicated components of the electrolyte is 1:4.

14. Current source according to claim 9, in which, as material from which the anode is made, an alloy is used, comprising one or more chemically active metals.

15. Current source according to claim 14, in which, as the indicated alloy, a lithium-silicon 20 alloy, lithium-aluminum alloy, a lithium-tin alloy or a lead-sodium alloy is used.

* * * * *